Feb. 18, 1947.                M. N. YARDENY                2,416,274
          CONTINUOUS CONTROL APPARATUS WITH LINEAR MOTION
                 Filed May 23, 1944          3 Sheets-Sheet 1
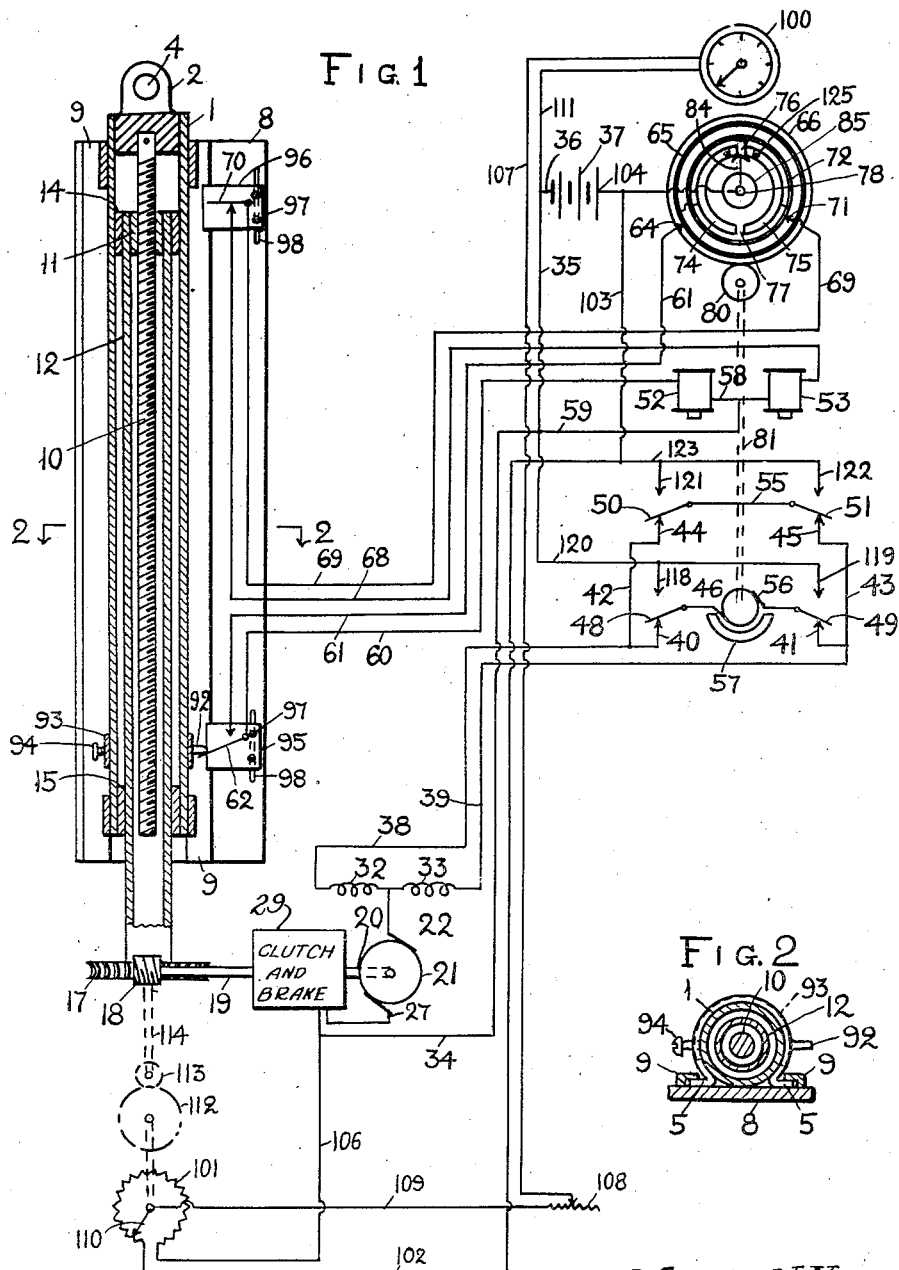
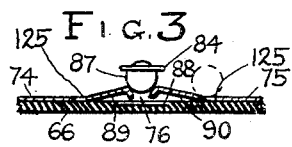
MICHEL N. YARDENY
INVENTOR
BY John P. Nikonow
ATTORNEY

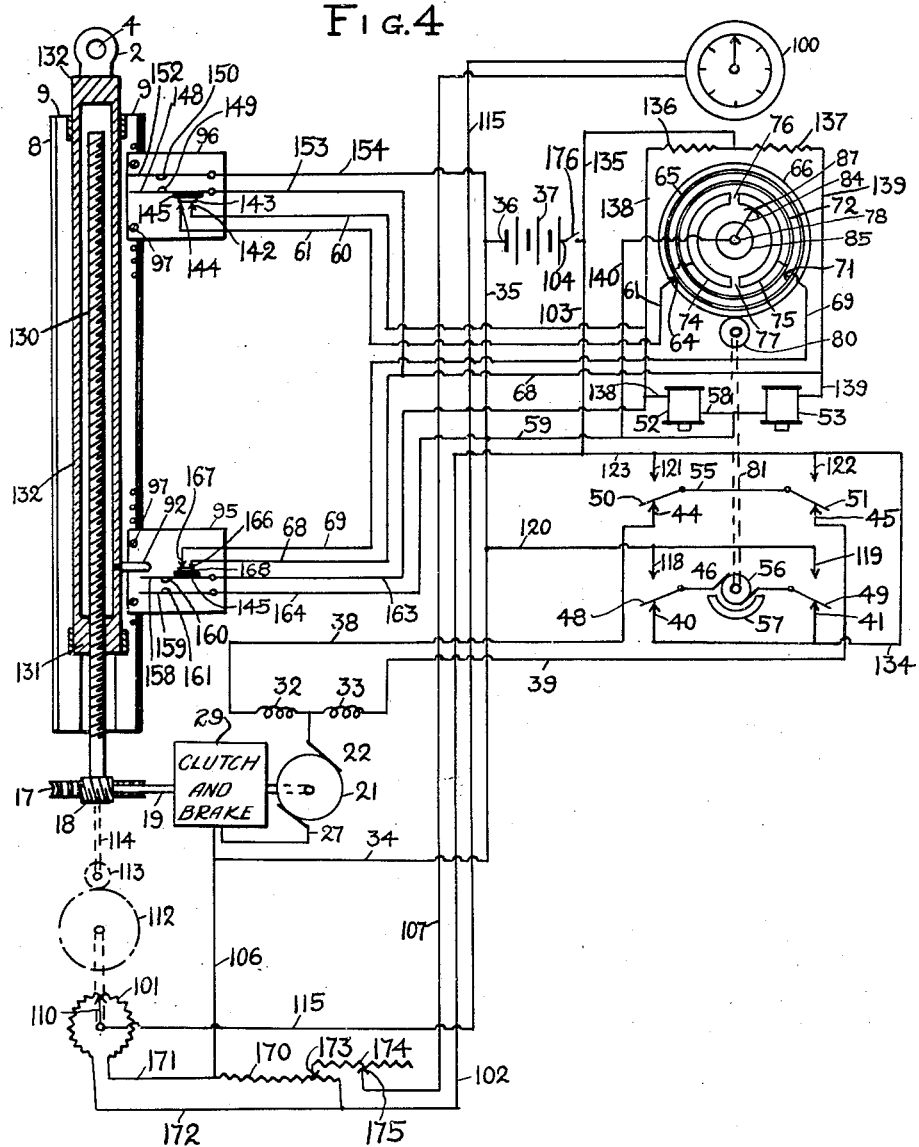

Feb. 18, 1947.   M. N. YARDENY   2,416,274
CONTINUOUS CONTROL APPARATUS WITH LINEAR MOTION
Filed May 23, 1944   3 Sheets-Sheet 3

MICHEL N. YARDENY
INVENTOR

BY John P. Wikonow
ATTORNEY

Patented Feb. 18, 1947

2,416,274

UNITED STATES PATENT OFFICE 2,416,274

CONTINUOUS CONTROL APPARATUS WITH LINEAR MOTION

Michel N. Yardeny, New York, N. Y.

Application May 23, 1944, Serial No. 536,915

5 Claims. (Cl. 172—239)

My invention relates to control apparatus and has particular reference to apparatus for placing an object or a useful load in any desired position within the limits of movement of the apparatus.

One object of my invention is to provide means for moving a useful load controlled by the control apparatus in a substantially rectilinear line. Such straight or rectilinear motion of the useful load is advantageous for certain fields of application where it is desired to effect a movement other than rotary or where a rotary motion must be produced by the agency of members having a reciprocating motion.

One desirable application of my control apparatus consists in an arrangement for the remote control of so-called "trim tabs" on airplanes, used in connection with the control of the movement of the wing ailerons, rudders and stabilizers. The trim tabs in such cases are provided with lugs or cranks pivotally connected with links operated by control devices having linear or reciprocal motion.

Another useful application of my device consists in an arrangement for remote control of variable stroke pumps in which stroke and rate of delivery are controlled during the operation of the particular pump or similar device.

Another object of my invention is to provide means to convert the rotary motion of drive means used with my apparatus into a linear motion which may be applied directly to the load or further converted into the motion along a curve. According to one embodiment of my invention, I accomplish this by introducing a threaded connection between the control elements and a driven member or drive means which operates the useful load.

Another object of my invention is to provide means to stop positively the drive means when the load is placed in the desired position within predetermined limits.

Another object of my invention is to provide means to stop positively the drive means when the latter reaches either one or the other of the predetermined limiting positions regardless of the position of the control elements of the apparatus. In one embodiment of my invention I accomplish this by deenergizing the operating motor and using an automatic brake, and in another embodiment I provide means to reverse the motor for an instant when it overruns the stopping point at the end of its path by inertia.

Another object of my invention is to prevent hunting of the motor or of the movable parts when the desired position is reached by the load, and also to stop positively the motor, preferably by electrodynamic means.

Another object of my invention is to provide improved means for indicating the correct position reached by the load.

Another object of my invention is to provide an arrangement whereby all the control elements and operating relays are mounted together at a control point, leaving the operating motor free of any such control elements and devices.

Other and further objects of my invention will be apparent from the description and the appended claims.

My invention is more fully described in the accompanying specification and drawings in which—

Fig. 1 is a diagrammatic view of a control apparatus according to my invention;

Fig. 2 is a sectional view taken on the line 2—2 of Fig. 1;

Fig. 3 is a detail view of control elements employed in my control apparatus;

Fig. 4 is a diagrammatic view of a modified control apparatus;

Figure 5:
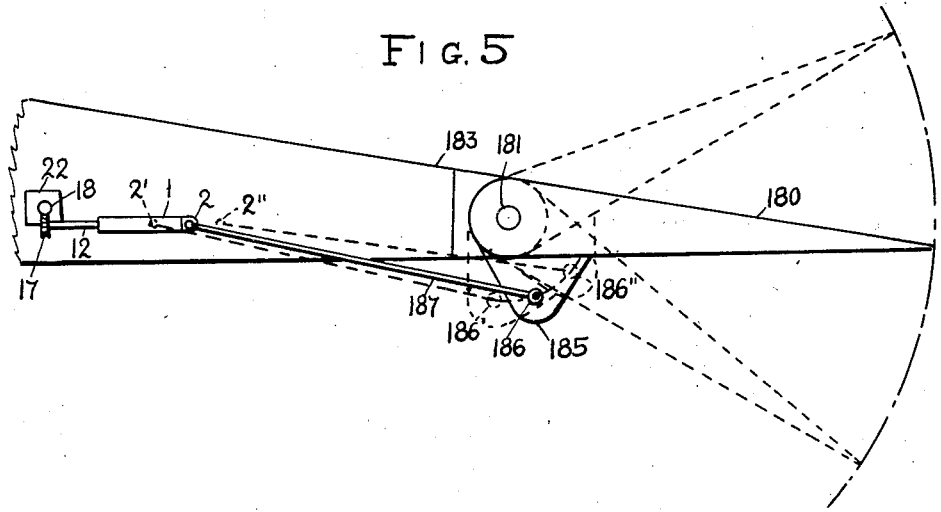
Fig. 5 is a diagrammatic view showing an application of my control apparatus for the operation of a trim tab of an airplane.

The control apparatus as shown by way of an example in Figs. 1, 2 and 3, comprises a tubular member 1 having an extension 2 at the outer end preferably provided with a hole 4 for pivotal or other connection to a useful load (not shown). The tube is provided with lugs 5 (Fig. 2) sliding on a base plate 8 and guided by rails 9. A threaded rod or screw 10 is fastened at one end to the extension 2 and is engaged by a nut 11 at the end of an inner or driving tube 12. The latter is provided with a bearing 14 rotatively and slidably engaging the inner surface of the outer tube 1. A similar bearing 15 is fitted inside the outer tube 1 for guiding the lower end of inner tube 12.

The lower end of the inner tube 12 mounts a worm gear 17 engaged by a worm 18 on a shaft 19 connected by an automatic electromagnetic clutch and brake 29 of a conventional type with a shaft 20 of an armature 21 of a motor generally designated by the numeral 22. The magnet coil of clutch and brake 29 is connected with the armature 21 by a lead 27 by leads 34, 35 with the terminal 36 of a source of current 37, and so arranged that the clutch and brake engages the two shafts together when the motor 22 is energized.

The motor 22 may be of any type and size suitable for operating the load and is shown as a reversible series wound D. C. motor, having two reversing windings 32, 33, connected in series with the armature 21. The free ends of the windings are connected by leads 38, 39 with relay contact points 40, 41 and by leads 42, 43 to a second pair of contact points 44, 45, the contact points being arranged to be engaged by arms 48, 49, 50 and 51 respectively of two double pole double throw relays having magnet coils 52 and 53. The relay arms 50, 51 are connected together by a lead 55 and the relay arms 48, 49 are connected to the terminals of an armature 56 of a control motor generally designated 46 and having a permanent field magnet 57. The ends of the relay coils are connected together by a lead 58 which is connected by leads 59, 35 with the terminal 36 of the source of current 37. The other end of the relay coil 52 is connected by lead 60, disconnecting switch 62 and a lead 61 with a brush 64 engaging a collector ring 65 on an insulation disc 66, the other coil 53 being connected by lead 68, switch 70 and lead 69 with a brush 71 engaging a collector ring 72. The collector rings 65, 72 are connected with control segments 74, 75 separated by gaps 76, 77. The disc 66 is mounted for rotation on a shaft 78 and is engaged by a friction or gear wheel 80 mounted on a shaft 81 operated by the motor 46. The segments 74, 75 are slidably engaged by a contact arm 84 mounted on the shaft 78 which can be manually rotated by a knob 85 at the end of the shaft. The end of the contact arm 84 may be provided with a contact ball 87 (Fig. 3). The ends 89, 90 of the segments 74, 75 are gradually raised toward the gap 76 and are steeply bent downwards into the gap, forming a seat for the ball 87. The ends 89, 90 are preferably made resiliently flexible so that they can yield under pressure of the ball thereby maintaining the ball engaging and bridging the gap while allowing a small relative resilient displacement between the segments and the contact arm. A recess 88 may be provided in the disc 66 for the flexible ends 89, 90. This arrangement allows the motor to be stopped while the gap is bridged and before the force of inertia may cause the contactor to leave the gap.

The tubular member 1 (Fig. 1 and Fig. 2) is provided with a lug 92 on a yoke 93 slidably fitted on the tube and locked in a desired position by a set screw 94. Lug 92 serves to control switches 62 and 70.

The disconnecting switches 62, 70 are mounted on plates 95, 96 carried by the base 8 and fastened by screws or bolts 97, the base having elongated slots 98 for allowing longitudinal adjustment of the switches on the base.

The position of the movable member 1 or of the useful load is indicated by an indicator 100 calibrated in suitable units of linear measurement such as inches and their fractions. The indicator may be electrically operated by electric current from a potentiometer 101 or other suitable voltage varying device. The potentiometer is connected by leads 102, 103 with the terminal 104 of the source of current 37 and by leads 106, 34, 35 with the other terminal 36. The indicator is connected by a lead 107, a variable resistor 108, and a lead 109 with a contact arm 110 of the potentiometer, and by a lead 111 with the terminal 36 of the source of current 37. The arm 110 is connected by gears 112, 113 with an extension shaft 114 connected with the worm gear 17. Ratio of the gears 112, 113 is so selected that the total travel of the member 1 or of the useful load corresponds to the maximum or suitable travel of the contact arm 110, and the meter 100 is adjusted to indicate this travel on its scale. The resistor 108 serves to adjust the zero point of the meter.

The relay arms 48, 49, when attracted by the energized coils, engage contact points 118, 119 connected by a lead 120 with the terminal 36, and the arms 50—51 engage contact points 121, 122 connected by leads 123, 103 with the terminal 37.

The operation of my apparatus is as follows:

Assuming that the member 1 is placed in its most inward (or the lowest in Fig. 1) position in which the switch 62 is opened by lug 92 rendering the relay coil 52 inoperative, and that it is desired to move the load in the opposite direction by moving the member 1 outward (or upward in Fig. 1), then knob 85 is turned in a clockwise direction, causing the contact arm 84 with its contact ball 87 to engage the segment 75. The relay coil 53 will be now energized through closed switch 70, attracting the arms 49 and 51. Current will pass from the terminal 104 of the source of current 37 through leads 103, 123, contact point 122, arm 51, lead 55, arm 50, point 44, lead 42 point 40, arm 48, armature 56, arm 49, point 119, and leads 120, 35 to the other terminal 36. The armature will rotate, turning the pinion 80 and the disc 66, the disc being turned in a clockwise direction, causing the gap 76 to follow the displaced contact arm 84.

Current will also flow from the point 40 through the lead 38, winding 32, armature 21 of the load or controlled motor 22, lead 27, the coil of the automatic clutch and brake 29, and leads 34, 35 to the terminal 36. The other winding 33 will be disconnected, relay 53 being energized. The armature 21 will rotate in a direction for moving the member 1 outward. This movement will be continued until the gap 76 reaches the contact arm 84, then both relay coils will be energized so that all four relay arms 48, 49, 50, 51 will be attracted, disconnecting the circuits through both motor armatures 21 and 56. The armature 56 will be short circuited by the lead 120 and will be dynamically braked by the permanent magnetic field. The clutch and brake coil being deenergized, thereby causing driving shaft 19 to be abruptly and positively stopped.

If the arm 84 is displaced again, both motors will be restarted and stopped again when the gap 76 catches up with the contact arm. Hence the motors will simultaneously start and stop as controlled by the movement of the contact arm, although the speed of the load motor may be different from the speed of the control motor. Both motors will be finally stopped when the arm 84 is no longer displaced, the true position of the load or of the member 1 being indicated by the indicator 100.

The indicator is necessary with this arrangement due to the fact that the true position of the load or of the member 1 may not correspond to the position of the contact arm 84. It may be necessary to make several revolutions of the contact arm 84 to cover the complete range of movement of the load as determined by the end positions of the member 1. The member 1 may be stopped in any intermediate position. When the extreme outward position is reached, the lug 92 will open the switch 70, disconnecting the relay coil 53 and stopping the motors. No further movement of the load in this direction will be possible, but coil 52 may be energized for the reverse movement by placing arm 84 on segment 74, switch 62 being closed.

For a more or less large movement of the load, the contact arm is simply moved to a position in which the contact ball 87 occupies the position indicated in dotted lines in Fig. 3 and is then released. The segment will then rotate together with the contact arm, the latter being held by friction in its position. This common rotation will continue until the contact arm is stopped by holding the knob 85. Depressions 125 or projections may be provided in the segments 74, 75 to increase the frictional resistance to displacement of the ball 87.

A modified apparatus is shown in Fig. 4. A screw member 130 is connected at one end directly to the worm gear 17 and is engaged by a nut 131 on an outer tubular member 132, the latter being of a construction similar to the member 1 of Fig. 1 and being provided with similar lugs for guiding its movement between the rails 9. Instead of the electromagnetic clutch shown in Fig. 1 an electromagnetic brake is provided.

The motors and their connections are similar to the corresponding parts of Fig. 1 and are accordingly designated by the same respective numerals. The only change is in that the load motor 22 is connected by the leads 38, 39 to the points 44, 45 only, and the points 40, 41 are connected by a lead 134 to the lead 123. The advantage of such a connection is that the upper relay contact points 44, 45 are used only for the load motor 22 and the lower points 40, 41 are used only for the control motor. 46. The control motor in this case is braked dynamically when the relays are both energized or deenergized. The relay connections are modified in that both relay coils are continuously energized, the coils being connected in a closed circuit by a lead 135 extending from the terminal 104, through resistors 136, 137, respectively, leads 138, 139 respectively and leads 58, 59, 35 to the terminal 36. The contact arm 84 is connected by a lead 140 with the lead 59 so that one or the other relay coil is short circuited when the contact arm 84 is moved into engagement with one or the other of the segments 74 and 75.

The relay coil 52 is connected by leads 138, 60 with a contact point 142 normally connected by a contact plate 143 with a contact point 144 connected by lead 61 with the brush 64 of the control disc 66. The plate 143 is mounted on an insulation block 145 supported on a resilient arm 148 with a contact point 149 normally separated from a corresponding contact point 150 on a resilient arm 152, both arms being supported on the switch base 96 adjustably fastened to the base 8 as by screws 97. The arm 148 is connected by leads 153, 68, 139 with the relay coil 53, the second arm 152 being connected by leads 154, 35, 58, 59 with the other terminal of the coil 53. A similar switch base 95 is mounted at the other end of the base 8 for resilient arms 158, 159 with contact points 160, 161, the arm 158 being connected by leads 163, 138 with one terminal of the coil 52, the other arm 159 being connected by leads 164, 59, 58 with the other terminal of the coil 52. Contact points 166, 167 are normally connected together by a plate 168. Contact point 166 is connected by leads 69, 139 with relay coil 53 and contact point 167 is connected by lead 69 with the brush 71.

The indicator 109 is provided with adjustments for zero and maximum points. These adjustments include a second potentiometer 170 connected by leads 171, 172 with the terminals of the first potentiometer 101. The second potentiometer is connected by an adjustable contact point 173 with a resistor 174 connected by an adjustable contact point 175 with the lead 107 of the indicator 109, the other indicator terminal being connected by a lead 115 with the arm 110. The contact point 175 adjusts the maximum position of the indicator in accordance with the most outward position of the movable member 132, and the point 175 adjusts the zero position of the indicator 109 for the starting position of the member 132.

Both relay coils are connected in a circuit, when an operating switch 176 is closed, a circuit for the relays being closed from the terminal 104 and closed switch 176 through lead 135, resistors 136, 137 and leads 138, 139, connected in parallel, through coils 52, 53 and leads 58, 59 and 35 to the other terminal 36. However both relay coils will be short circuited and release their arms as long as the contact arm 84 occupies the gap 76. The coil 52, for instance, is by-passed by the leads 59, 140, arm 84, segment 74, brush 64, lead 61, point 144, plate 143, point 142, leads 60, 138, resistor 136, and lead 176. The coil 53 is similarly by-passed. Both motors are deenergized and the control motor armature 56 is dynamically braked when both relay coils are short-circuited.

The operation of the device is as follows:

It be assumed that it is desired to move the load and the tube 132 outward and that it will be necessary for this purpose to move the contact arm 84 to the right.

When the contact arm 84 is moved to the right by turning the knob 85, the coil 53 will remain short-circuited and hence inoperative, the coil 53 being short-circuited from the terminal 104 and switch 176 through the lead 135, resistor 137, leads 139, 68, point 166, plate 168, point 167, lead 69, brush 71, ring 72, segment 75, contact arm 84, and leads 140, 59 and 35 to the other terminal 36. The coil 53 being short circuited, the arms 49, 51 remain released, engaging the points 41 and 45 respectively. Coil 52 attracts its arms 48, 52, the short circuit of this coil being now removed. Both motors will be energized, current for the load motor 22 passing from the terminal 104 and switch 176 through the leads 103, 123, point 121, arm 50, lead 55, arm 51, point 45, lead 39, winding 33, armature 21, lead 27, the coil of clutch and brake 29, and leads 34, 35 to the other terminal 36. The control motor 46 will be similarly energized, current passing from the terminal 104 and switch 176 through leads 103, 123, 134, point 41, arm 49, armature 56, arm 48, point 118, and leads 120, 35 to the other terminal 36. The rotation of the motors will continue until the gap 76 reaches the contact arm 84, the disc 66 being rotated by the armature 56. The motors will be stopped when the gap is bridged by the contact arm 84.

If the rotation of contact arm 84 is continued, the motors will continue to rotate until they are finally stopped by the finger or lug 92 operating the corresponding limit switch. Thus if the movement of the tube 132 was inward (or downward on the drawing), the lug 92 will first deflect the arm 158, disconnecting the leads 68, 69 at plate 168 and breaking the short circuiting connections of the relay coil 53, allowing the coil to be energized by the current through the resistor 137. Both coils are now energized, attracting both sets of the arms 48, 49, 50, 51 and stopping the motors. If the load drive overruns its stopping position by inertia, the arm 158 will be forced into contact with the arm 159, short circuiting the coil 52 by connecting leads 163 and 164. With the coil 53 alone energized, the motors will be reversed, current now passing through the other field winding 32 of the load motor and in the opposite direction through the armature 56 of the control motor.

A suitable arrangement may be provided for preventing or suppressing oscillations of the motor or drive means when the contactor 84 reaches the gap, similar to the arrangement of Fig. 3 and which involves the use of resilient conducting members and raised points at the gap.

Any tendency of the motors to oscillate when the limit switches are operated may be suppressed in a similar manner, principally by providing a sufficient length of resilient travel for the contact arms 158, 159 and 148, 152 so that the motors will remain deenergized during a short travel of the moving parts by inertia until the motors are stopped or even momentarily reversed.

The remote control system according to the invention can be used for operating various devices in which an object must be moved to any desired distance within certain limits. One of such possible and practical applications is shown in Fig. 5 which illustrates operation of a trim tab 180 of an airplane, the tab being pivoted at 181 to the end portion 183 of an aileron, rudder or elevator. The tab is provided with a lug 185 pivotally connected at 186 to one end of a rigid rod 187 whose other end is pivotally connected to the end portion 2 of member 1 such, for instance, as shown in Fig. 1. The extreme positions of the tab are shown in dotted lines, the pivot 186 correspondingly occupying end positions 186', 186''. The end 2 of the apparatus will then occupy positions 2', 2''. The movable portion 12 of the apparatus is operated by the motor 22 through suitable gears 17, 18.

Figure 6:
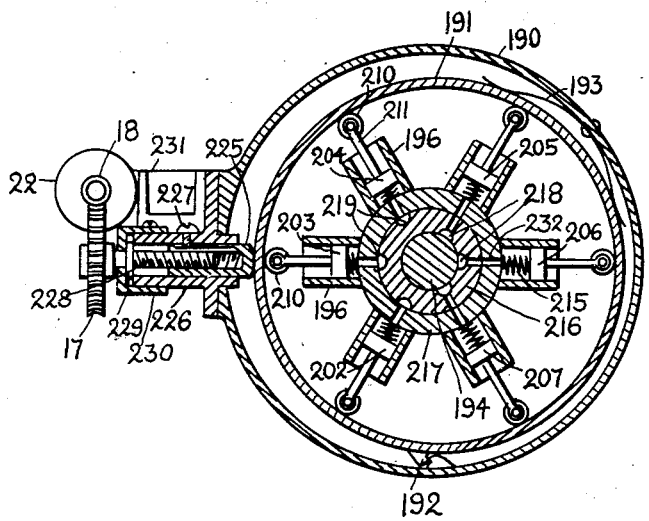
Fig. 6 is a sectional view showing an application of my control apparatus for the remote control of a variable stroke pump.

Another practical application of my apparatus is shown in Fig. 6 which illustrates a variable displacement pump having a sealed housing 190 with an adjustable ring 191 inside. The ring is fulcrumed at 192 and is urged by a spring 193 into a position approximately concentric with a tubular shaft rotated by a suitable source of power. Shaft 217 mounts cylinders 196 with pistons 202, 203, 204, 205, 206, 207 with rollers 210 at the ends of their rods 211, the rollers engaging the inside surface of the ring 191. Springs 215 urge the pistons outward. The shaft 217 rotates on a stationary member 216, with intake channels 218 and exhaust channels 219 formed between member 216 and a central core 194. These channels communicate with the cylinders by ports 232 when the corresponding channels and ports in stationary member 216 and rotary shaft 217 are in registry. The channels are connected respectively to intake and exhaust manifolds in a conventional manner.

The pistons 202, 203, 204 are moved inward because of the eccentric position of the ring while the pistons 205, 206, 207 are moved outward.

The length of the piston stroke is varied depending on the position of the ring 191. When it is desired to make the adjustment more or less frequently and even during the operation of the pump, this can be accomplished by the use of a remote control apparatus according to the invention. The operating portions of the apparatus include a plunger 225 sliding in a cylinder 226 and prevented from rotation by a set screw 227 the end of which slides in a longitudinal groove in member 225. The plunger is threaded on a screw 228, having a flange 229 retained by a cap 230. The screw is fastened to the worm gear 17 engaged by the worm 18 mounted on the end of the shaft of the motor 22. The motor is mounted on a bracket 231 attached to the casing 190. The ports may be staggered to provide for a substantially continuous pumping action.

I claim as my invention:

1. A control apparatus comprising a pair of independently movable control elements; a reversible control motor operatively connected with one of the control elements, the other control element being arranged to be moved by other means; reversible drive means constructed to move in a substantially straight line and arranged to operate a useful load; a second motor for operating the drive means; means to electrically control both motors by the relative position of the control elements and to deenergize the motors in any desired position of the load in response to the control elements occupying a predetermined relative position; limit switches constructed and positioned to deenergize both the motors and to stop the drive means in either direction at predetermined extreme positions thereof, thereby limiting the movement of the drive means independently of the control elements; and reversing switches, one reversing switch being positioned beyond each corresponding limit switch for reenergizing the load motor in reversed direction when the drive means overruns by inertia its stopping position as determined by the respective limit switch.

2. A control apparatus comprising a pair of independently movable control elements; a reversible control motor operatively connected with one of the control elements, the other control element being arranged to be moved by other means; reversible drive means arranged to operate a useful load; a second motor for operating the drive means; means to electrically control both motors by the relative position of the control elements and to deenergize the motors in any desired position of the load in response to the control elements occupying a predetermined relative position; limit switches constructed and positioned to be opened by the drive means for deenergizing both the motors and stopping the drive means in either direction at predetermined extreme positions thereof, thereby limiting the movement of the drive means independently of the control elements; and reversing switches, one reversing switch being positioned beyond each corresponding limit switch to be closed by the drive means for reenergizing the load motor in reversed direction when the drive means overruns by inertia its stopping position as determined by the respective limit switch.

3. A control apparatus comprising a pair of independently movable control elements; a reversible control motor operatively connected with one of the control elements, the other control element being arranged to be moved by other means; reversible drive means arranged to operate a useful load; a second motor for operating the drive means; means to electrically control both motors by the relative position of the control elements and to deenergize the motors in any desired position of the load in response to the control elements occupying a predetermined relative position; limit switches constructed and positioned to be opened by the drive means for deenergizing both the motors and stopping the drive means in either direction at predetermined extreme positions thereof, thereby limiting the movement of the drive means independently of the control elements; and reversing switches, one reversing switch being positioned beyond each corresponding limit switch to be closed by the drive means for reenergizing the load motor in reversed direction when the drive means overruns by inertia its stopping position as determined by the respective limit switch; each of said reversing switches being arranged to be reopened by the drive means upon reversal prior to the re-closing of the corresponding limit switch for stopping the motor thereby preventing hunting of the load motor.

4. A control apparatus comprising a pair of independently movable control elements; a reversible control motor operatively connected with one of the control elements, the other control element being arranged to be moved by other means; reversible drive means arranged to operate a useful load; a second motor for operating the drive means; means to electrically control both motors by the relative position of the control elements and to deenergize the motors in any desired position of the load in response to the control elements occupying a predetermined relative position; limit switches constructed and positioned to be opened by the drive means for deenergizing both the motors and stopping the drive means in either direction at predetermined extreme positions thereof, thereby limiting the movement of the drive means independently of the control elements; and reversing switches, each of said reversing switches including two resilient contact members normally spaced apart and arranged beyond a corresponding limit switch to be closed by the drive means for reenergizing the load motor for movement of the drive means in reversed direction when the drive means overruns by inertia its stopping position as determined by the respective limit switch; said reversing switches being constructed and positioned to be released by the drive means for opening the same prior to the reclosing of the respective limit switch in response to a movement of the drive means in reversed direction thereby stopping the load motor.

5. A control apparatus as described in claim 2, wherein said limit switches and reversing switches are adjustably supported for adjusting the positions of the said switches in which they are operated by the drive means.

MICHEL N. YARDENY.

REFERENCES CITED

The following references are of record in the file of this patent:

UNITED STATES PATENTS

| Number | Name | Date |
|---|---|---|
| 708,074 | Allen | Apr. 9, 1929 |
| 1,835,907 | Shiland | Dec. 8, 1931 |
| 2,342,717 | Yardeny | Feb. 29, 1944 |

FOREIGN PATENTS

| Number | Country | Date |
|---|---|---|
| 574,666 | French | July 17, 1924 |
| 127,755 | German | Jan. 29, 1902 |
| 264,401 | German | Sept. 24, 1913 |